United States Patent
Aryan et al.

(10) Patent No.: US 8,948,063 B2
(45) Date of Patent: Feb. 3, 2015

(54) METHOD AND SYSTEM FOR REAL-TIME CALIBRATION AND REPORTING OF PROCESSING DELAY

(75) Inventors: Babak Aryan, San Diego, CA (US); Xiaoyin He, San Diego, CA (US); Mohammad Ali Tassoudji, Cardiff, CA (US)

(73) Assignee: QUALCOMM Incorporated, San Diego, CA (US)

( * ) Notice: Subject to any disclaimer, the term of this patent is extended or adjusted under 35 U.S.C. 154(b) by 717 days.

(21) Appl. No.: 12/687,736

(22) Filed: Jan. 14, 2010

(65) Prior Publication Data

US 2011/0170463 A1  Jul. 14, 2011

(51) Int. Cl.
*H04B 7/005* (2006.01)
*G01S 13/74* (2006.01)

(52) U.S. Cl.
CPC .................................... *G01S 13/74* (2013.01)
USPC ........................................................ 370/278

(58) Field of Classification Search
USPC ......... 370/254, 252, 278, 282, 289, 286, 324, 370/350, 503; 455/456.1, 456.5, 457
See application file for complete search history.

(56) References Cited

U.S. PATENT DOCUMENTS

| | | | | |
|---|---|---|---|---|
| 6,353,412 | B1* | 3/2002 | Soliman | 342/387 |
| 6,516,183 | B1* | 2/2003 | Hellmark | 455/78 |
| 6,687,501 | B2 | 2/2004 | Soliman | |
| 7,006,834 | B2 | 2/2006 | Gaal et al. | |
| 2005/0058081 | A1* | 3/2005 | Elliott | 370/252 |
| 2006/0012476 | A1 | 1/2006 | Markhovsky et al. | |
| 2006/0023749 | A1* | 2/2006 | Yoshizawa et al. | 370/470 |
| 2007/0247368 | A1 | 10/2007 | Wu | |
| 2008/0225775 | A1* | 9/2008 | Proctor et al. | 370/315 |
| 2008/0287153 | A1* | 11/2008 | Fullam | 455/502 |
| 2009/0122805 | A1* | 5/2009 | Epps et al. | 370/417 |
| 2010/0091924 | A1* | 4/2010 | Wu | 375/355 |
| 2010/0093282 | A1* | 4/2010 | Martikkala et al. | 455/63.4 |

FOREIGN PATENT DOCUMENTS

| | | |
|---|---|---|
| CN | 101043315 A | 9/2007 |
| EP | 0911993 A2 | 4/1999 |
| JP | 11127104 | 5/1999 |
| JP | 2002505560 A | 2/2002 |
| JP | 2008267973 A | 11/2008 |
| WO | WO-9944375 A1 | 9/1999 |

OTHER PUBLICATIONS

International Search Report and Written Opinion—PCT/US2011/021419—ISA/EPO—Apr. 20, 2011.
Taiwan Search Report—TW100101482—TIPO—Apr. 22, 2013.

* cited by examiner

*Primary Examiner* — Peter Cheng
(74) *Attorney, Agent, or Firm* — Jennifer M. Pascua

(57) ABSTRACT

The subject matter disclosed herein relates to a system and method for estimating transmit chain and receive chain processing delays by a first wireless device. In a particular implementation, a first signal may be wirelessly transmitted from a first wireless device and at least a portion of the first signal may be received by a receiver of the first wireless device during transmission of the first signal. A first transmit processing delay and a first receive processing delay associated with the first signal may be measured or determined based at least in part on the receipt of the at least a portion of the first signal during the transmission of the first signal.

48 Claims, 10 Drawing Sheets

METHOD AND SYSTEM FOR REAL-TIME CALIBRATION AND REPORTING OF PROCESSING DELAY

BACKGROUND

1. Field

The subject matter disclosed herein relates to calibration and reporting of processing delay for location estimation.

2. Information

A mobile device, such as a cell phone, personal digital assistant (PDA), or any other mobile wireless device may from time to time determine its location or position. If a mobile device is used in an outdoor area, for example, the mobile device may estimate its location based upon navigation signals received from a Satellite Positioning System (SPS). However, there are sometimes certain areas where navigation signals from an SPS may not be available, such as in certain indoor locations.

A mobile device can estimate its location within an area where navigation signals from an SPS are not available. For example, a mobile device may transmit a signal to an access point or other wireless device associated with a known location. Upon receipt of such a signal, the access point or other wireless device may transmit a response signal to the mobile device. A range from the access point or other wireless device may be estimated based upon the measured duration of time from transmission of a signal by the mobile device to receipt of a response signal.

However, an access point may experience a processing delay from receipt of a signal from a mobile device to transmission of a response signal to the mobile device. Such a processing delay may vary depending upon operating conditions, for example, of the particular access point or other wireless device.

BRIEF DESCRIPTION OF THE FIGURES

Non-limiting and non-exhaustive features will be described with reference to the following figures, wherein like reference numerals refer to like parts throughout the various figures.

SUMMARY

Figure 1:
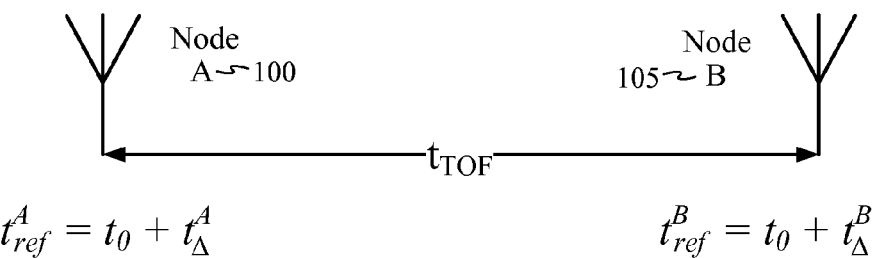
FIG. 1 illustrates time references and time of flight (TOF) delays associated with a round trip delay (RTD) measurement between two nodes according to one implementation.

In one particular implementation, a system and method for estimating transmit chain and receive chain delays by a first wireless device are provided. The subject matter disclosed herein relates to a system and method for estimating transmit chain and receive chain delays by a first wireless device. The first wireless device wirelessly transmits a first signal and receives at least a portion of the first signal during the transmission of the first signal. A first transmit processing delay and a first receive processing delay associated with the first signal are estimated based at least in part on the receiving of the at least a portion of the first signal during the transmission of the first signal. It should be understood, however, that this is merely an example implementation and that claimed subject matter is not limited in this respect.

DETAILED DESCRIPTION

Reference throughout this specification to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

A mobile device may identify its location based on signals wirelessly received from access points or other devices capable of wirelessly transmitting signals. For example, a mobile device may be utilized within an area where navigation signals from a Satellite Positioning System (SPS) are not available, such as within certain buildings or other structures. Access points and/or other wireless devices may be located throughout such an area at known locations and a mobile device may estimate ranges from a mobile device to particular access points. Alternatively, a mobile device located within an area where SPS navigation signals are unavailable may communicate with one or more wireless devices having known locations, such as earth-centered coordinates. In one example, a wireless device located within an area where SPS navigation signals are available may determine its location and communicate with a mobile device located within an area where such SPS navigation signals are not available. Ranges from such a mobile device to one or more access points or other wireless devices may be estimated, and a location of such a mobile device may be computed using known techniques.

A mobile device may use any one of several techniques to estimate a range to an access point, base station, or other wireless device. While performing range measurements for positioning or proximity applications, one solution is to measure the time of signal flight (referred to herein as "Time of Flight" or "TOF") from a transmitting device to a receiving node. By converting a TOF measurement to the distance traveled by the signal, an estimate of a range between the transmitting device and receiving node may be generated.

In order to make the TOF measurement, however, transmitting and the receiving nodes may be time synchronized. This way, a transmitting node commences transmission at a pre-agreed time boundary, and a receiving node measures a TOF delay it took the signal to be received compared to this time boundary.

In one implementation, a mobile device may estimate its own location by communicating with one or more nearby femtocells. A "femtocell," as used herein, may refer to a small cellular base station. Such a femtocell may connect to a service provider's network via broadband (such as, for example, via Digital Subscriber Line (DSL) or cable). A femtocell may, for example, utilize a technology such as Universal Mobile Telecommunications System (UTMS), Long Term Evolution (LTE), Evolution-Data Optimized or Evolution-Data only (EV-DO), Global System for Mobile communications (GSM), Worldwide Interoperability for Microwave Access (WiMAX), Code division multiple access (CDMA)-2000, or Time Division Synchronous Code Division Multiple Access (TD-SCDMA), to name just a few among many possible technologies compatible with femtocells.

In one implementation, a range is estimated by a process in which a probe request signal is wirelessly transmitted to a particular access point or other wireless device. Upon receiving such a probe request, an access point or other wireless device may wirelessly transmit a response signal. A mobile device may measure a time interval (referred to herein as "Round Trip Delay" or "RTD") between when the mobile device transmits the probe request and a time at which the response signal is received. Wirelessly transmitted signals travel at a known speed, which is the speed of light. Accordingly, based upon an RTD from transmission of a probe request to receipt of a response, a range may be estimated. However, an access point or other wireless device typically experiences certain processing delays, such as a receive chain delay'(Rx), and a transmit chain delay (Tx) between a time at which a probe request is received and a time at which a response signal is transmitted.

"Processing delay," as used herein may refer to a delay incurred by an electronic device between receiving a message, packet, signal, or other information and performing a particular operation or action based at least in part on the received message, packet, signal, or other information. For example, if a probe request packet or signal is received by a wireless device, the wireless device may transmit a response packet or signal after performing certain operations and/or making certain calculations. In one example, upon receiving a probe request, a processing delay is incurred while extracting an identity of a wireless device from which the probe request was transmitted and generating a response to transmit. In the case of ranging, for example, a processing delay comprises the delay from the time a signal hits a receiver's antenna to the time the receiver has actually demodulated the signal, decided that the signal was intended for the device, and estimated the time of flight. Similarly, another delay is associated with the time taken by a device from the time it has decided to send a response (e.g., after detecting a received "beacon message") to the time the signal is actually leaving the antenna.

"Receive chain delay," as used herein may refer to a delay incurred by an electronic device upon receipt of a wirelessly transmitted packet and/or signal. For example, if a packet or other wireless signal is received by an antenna and is subsequently provided to electronic circuitry within a wireless device, propagation of the packet or other wireless signal through the antenna, demodulator and decoder circuitry, and/or other circuitry may occur within a certain time interval.

"Transmit chain delay," as used herein may refer to a delay incurred by an electronic device upon transmission of a wirelessly transmitted packet and/or signal. For example, if a response packet or other wireless signal is generated and provided to an antenna for transmission by a wireless device, propagation of the packet or other wireless signal through the antenna, delays associated with formation of a transmit packet/signal through a modulator, and/or other circuitry may occur within a certain time interval. Delays associated with demodulation and modulation may or may not be critical in determining a time of flight of a signal. However, in performing round-trip delay measurements, such modulation/demodulation delays are accounted for.

A receive chain delay and a transmit chain delay may vary based upon current operating conditions. For example, on a hot day a speed at which a signal travels through an antenna and/or other circuitry may be different from a speed at which such a signal would travel on a cold day. Accordingly, a transmit chain delay and/or a receive chain delay may be dependent upon ambient temperature. Other factors which may influence a transmit chain delay and/or a receive chain delay may include, for example, a frequency at which a circuit is operating. For example, a group delay through transmit/receive circuitry may be frequency dependant. A size and type of packet may also impact an amount of processing to take place in a demodulator or modulator to decode or assemble a packet, respectively. Also, depending on a received signal strength (SNR), an amount of processing to take place at a receiver to detect, demodulate, and decode the signal may vary.

To provide an accurate estimate of range based on a measured time interval, the mobile device may subtract an estimate of processing delays from the measured roundtrip delay interval. However, different access points or other wireless devices may experience different processing delays. Such variance in processing delays may be based at least in part on current operating conditions. To precisely account for such different processing delays, an estimate of a processing delay specific to a particular access point or other wireless device may be provided to a mobile device. Once a measurement of a roundtrip delay between transmitting a probe request and receiving a response signal has been made, and a processing delay specific to an access point has been subtracted, a measurement of a range from the access point to the mobile device may be estimated based on such a time measurement.

An RTD measurement scheme, as opposed to a TOF measurement scheme, may eliminate a need for time synchronization. For example, any time difference between a transmitting device and a receiving device shows up in two implicit one-way TOF measurements but with opposite signs that cancel each other out, as discussed below.

An additional delay remaining in an RTD measurement scheme is that of processing time of a waveform for transmission and the processing time of a received signal. This value, in some standards referred to as "Back to the Future" BTF, has traditionally been measured and recorded per design to an accuracy of ~1 μs. However, since every 1 μs of error in the TOF measurement translates to a range estimate error of approximately 300 m, calibration of such residual delays to a higher accuracy may improve performance of such ranging and positioning systems.

Techniques discussed herein may be applied, with minor modifications, to measurements done in both full duplex and half duplex systems. A "full duplex" method is applicable to measurements taken between one or more base stations (BS) or access points (AP) and mobile stations (MS) or access terminals (AT) in Frequency Division Duplex (FDD) or Time Division Duplex (TDD) systems. The "half duplex" method, on the other hand, is more applicable to peer-to-peer (e.g., MS-MS or AT-AT) settings also in both FDD or TDD systems.

An implementation provides means for measuring delays associated with waveform processing for transmission and reception of ranging signals (e.g., Tx and Rx chain delays) to a great accuracy. Such measurements, furthermore, may be reported to participating nodes in real-time RTD measurements.

In a mobile terminal design, a low bill of material (BOM) cost is of great consideration. Accordingly, an RF architecture that aims to enable mobile wireless devices to perform RTD measurements at a relatively low cost while maintaining measurement fidelity may be very valuable.

RTD measurements between two nodes, such as between a mobile station and a base station, access point, a second mobile station, or any other wireless device may contain not only a delay due to TOF from one node to another node but also the time delays associated with each node's imperfect synchronization to "true" time and the processing delays at each node.

FIG. 1 illustrates time references and TOF delays associated with an RTD measurement between two nodes, e.g., Nodes A 100 and B 105, according to one implementation. In one example, Node A 100 may comprise a mobile device and Node B 105 may comprise another mobile device, an access point, base station, or any other type of wireless communication device. In the example shown in FIG. 1, Nodes A 100 and B 105 may not have synchronized clocks and therefore a time reference at Node A 100 may differ from a corresponding time reference at Node B. In this example, if both Node A 100 and B 105 were synchronized to a master clock, both Nodes A 100 and B 105 would have internal clock references that read $t_0$. However, because of a potential lack of synchronization between clocks at Nodes A 100 and B 105, the respective time references at Node A 100 and B 105 may differ.

As shown, a time reference ($t_{ref}^{node}$) at each node is given by the "true" time (e.g., $t_0$) plus any synchronization error: $t_{ref}^{node} = t_0 + t_\Delta^{node}$, where "node" can be either A or B. Equation term $t_\Delta^{node}$ indicates a time difference between a true time (e.g., $t_0$) of, for example, a master clock, and a clock of a particular node. In other words, $t_\Delta^{node}$ indicates an amount of time by which a clock at a node lags or leads a master clock. Tx & Rx chain processing delays associated with each node are designated herein as $\Delta t_{Tx}^{node}$ and $\Delta t_{Rx}^{node}$, respectively. Therefore, a time delay of a signal traveling between nodes A and B as observed and reported by node B is given by $$t_d^{AB} = t_0 + t_\Delta^B + \Delta t_{Tx}^A + \Delta t_{Rx}^B + t_{TOF} - (t_0 + t_\Delta^A)$$ ["Equation A"].

Specifically, Equation A shows that if a signal is transmitted from Node A to Node B, a time delay is determined by subtracting a time observed by Node A when the signal is transmitted from a time observed by Node B when the signal is received. A time at which a signal is provided by Node A to a transmission chain is $t_0 + t_\Delta^A$. A time at which a signal is received by Node B and provided from a receive chain to a processor or other processing device within Node B is $t_0 + t_\Delta^B$. A time duration for a signal to be transmitted between a transmit chain of Node A and a receive chain of Node B is designated as $t_{TOF}$ in Equation A. Other factors to account for are a transmit chain delay, Tx, for Node A and a receive chain delay, Rx, for Node B (e.g., because the signal is transmitted from Node A to Node B). A Tx chain delay for Node A is designated as $\Delta t_{Tx}^A$ and an Rx chain delay for Node B is designated as $\Delta t_{Rx}^B$.

Similarly, a time delay for a signal transmitted from Node B to Node A may be observed and reported by Node A according to the following equation:

$$t_d^{BA} = t_0 + t_\Delta^A + \Delta t_{Tx}^B + \Delta t_{Rx}^A t_{TOF} - (t_0 + t_\Delta^B)$$ ["Equation B"].

If both the time delays for a signal transmitted from Node A to Node B and for a signal transmitted from Node B to Node A are known, a TOF for signals transmitted between Nodes A and B may be estimated by averaging the time delays observed for a signal transmitted from Node A to B (designated as $t_d^{AB}$ below) with a signal transmitted from Node B to A (designated as $t_d^{BA}$ below).

$$\hat{t}_{TOF} = \frac{t_d^{AB} + t_d^{BA}}{2}$$ ["Equation C"]

$$= t_{TOF} + \frac{\Delta t_{Rx}^A + \Delta t_{Tx}^A + \Delta t_{Rx}^B + \Delta t_{Tx}^B}{2}$$

As shown in Equation C, averaging a time delay for a signal transmitted from Node A to Node B with a signal sent from Node B to Node A results in the cancellation of several terms shown above in Equations A and B. After such terms cancel, the resultant Equation C indicates that an average time delay observed when transmitting a signal between Node A and B is equal to the actual TOF (designated as $t_{TOF}$) and ½ of the measured Tx chain delays at Nodes A and B and ½ of the measured Rx chain delays at Nodes A and B.

As mentioned above, a sum of Tx & Rx chain delays at each node may be referred to as the "Back to the Future" (BTF) value and may be measured during test time at factory to an accuracy of ~1 µs: $t_{BTF}^{node} = \Delta t_{Rx}^{node} + \Delta t_{Tx}^{node}$ However, in an implementation discussed herein, the Tx and Rx chain delays may be measured on-the-fly with greater accuracy than would be possible if Tx and Rx chain delays were simply measured at a factory. Measuring Rx and Tx chain delays in real-time may account for variations in such delays due, for example, to temperature and signal frequency.

Various RF architectures may be utilized that have different performance and associated processing, Rx chain and Tx chain delays. A basic sequence of operations for measuring an RTD is the same for each RF architecture in various implementations. The only difference in making the RTD measurement using the different RF architectures is in choosing whether a beacon message or beacon frame is transmitted in full duplex or half duplex (peer-to-peer) mode.

Various RF architectures may measure a Tx+Rx chain delay and transmit a measurement of the Tx+Rx chain delay to a receiving node. During transmission of a portion of a signal, some of the signal attenuated by several dB may leak back into an Rx chain. In other words, if a wireless device transmits a signal, a portion of the signal may be received by an Rx chain of the wireless device. If, for example, an Rx chain of a wireless device is tuned to a corresponding transmission frequency during transmission of a beacon message or other signal, the wireless device can detect and demodulate the beacon message being transmitted locally and measure the time it took the beacon message to travel through both Tx & Rx chains of the wireless device. A path that a "leaked" signal takes back through an Rx chain may differ slightly based on different RF architectures as discussed herein, giving rise to different degrees of accuracy in estimating processing delays based on the particular RF architecture implemented.

Figure 2:
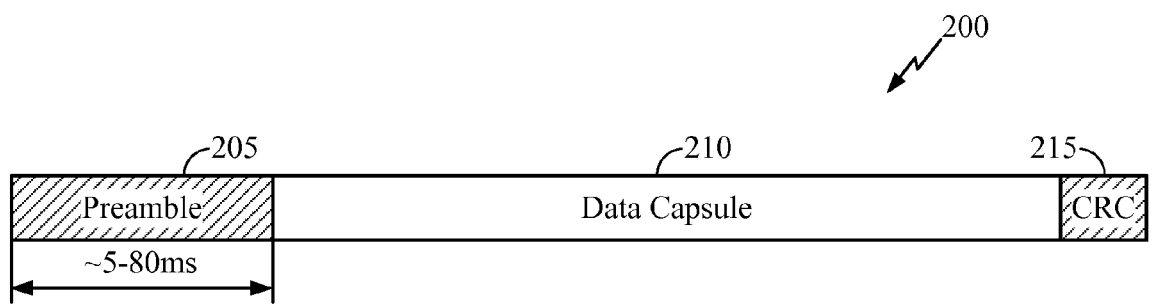
FIG. 2 illustrates a format or layout of a beacon message transmitted by a wireless device according to one implementation.

FIG. 2 illustrates a format or layout of a beacon message 200 transmitted by a wireless device according to one implementation. Beacon message 200 may comprise a signal transmitted to a wireless device and may comprise, for example, an access probe. Beacon message 200 may be comprised of different portions, such as a preamble 205, data capsule 210, and a cyclic redundancy check (CRC) portion 215. Preamble 205 may comprise a portion of beacon message 200 containing no data. For example, preamble 205 may be utilized for synchronizing between a wireless device transmitting beacon message 200 and a wireless device receiving beacon message 200. Preamble 205 may include, for example, a fixed code and a detect phase. A fixed code of preamble 205 makes its detection possible by any device that is aware of that fixed code, and once detected, a phase of a received signal may be estimated. Generally, a fixed code is used to aide in decoding the message capsule portion of the beacon message. During transmission of preamble 205, a portion of the transmitted preamble 205 may be received via a receive chain of a wireless device from which beacon message 200 is transmitted. Preamble 200 may be of varying duration, usually for example, of a period greater than ~5 milliseconds. A portion of preamble 200 may be received through the Rx chain of the transmitting wireless device prior to transmitting data capsule 210.

Upon receiving a portion of preamble 200, a wireless device may determine its own Tx and Rx chain delays and may transmit its measured Tx and Rx chain delays within data capsule 210 of beacon message 200.

A wireless device may encapsulate an estimated Tx and Rx chain delay within data to be sent in data capsule 210 before the preamble 205 has been fully transmitted. Data capsule 210 may include a combination of a measured Tx and Rx chain delays and other information, such as an identity of a wireless device transmitting beacon message 200, and a Time-of-Arrival (TOA) measurement if applicable. CRC 215 may include a hash function utilized to detect accidental changes to data transmitted within data capsule 210, for example.

Figure 3:
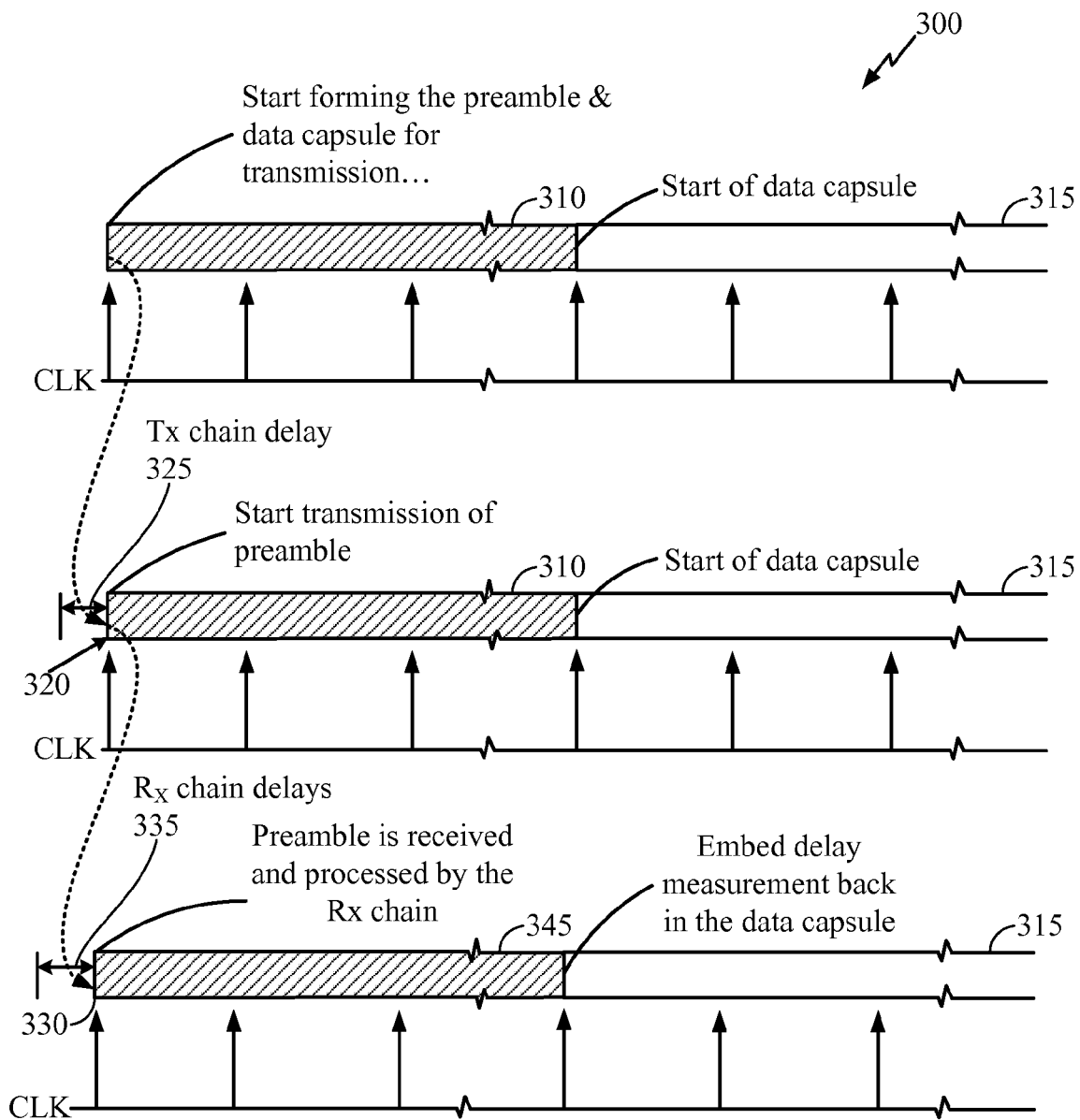
FIG. 3 illustrates timing diagrams of delay measurements according to one implementation.

FIG. 3 illustrates timing diagrams of delay measurements according to one implementation. In a first timing diagram 300, a beacon message is generated that is to be transmitted. Such a beacon message includes a preamble 310 and a data capsule 315. A second timing diagram 320 illustrates a timeline of transmission of the beacon message via a Tx chain of a wireless device. As shown, there is a Tx chain delay 325 between when preamble 310 is formed and a time at which preamble is transmitted via a Tx chain of a wireless device. A third timing diagram 330 illustrates a timeline of receipt of the beacon message via an Rx chain of a wireless device transmitting the beacon message. As shown, there is a measured Tx and Rx chain delay 335 from formation of preamble 310 by a wireless device until transmission of preamble 310 via a Tx chain and subsequent receipt of the preamble 310 via an Rx chain of the wireless device. A measured Tx and Rx chain delay may be encapsulated within data capsule 315 and transmitted to a wireless device receiving the beacon message.

Figure 4:
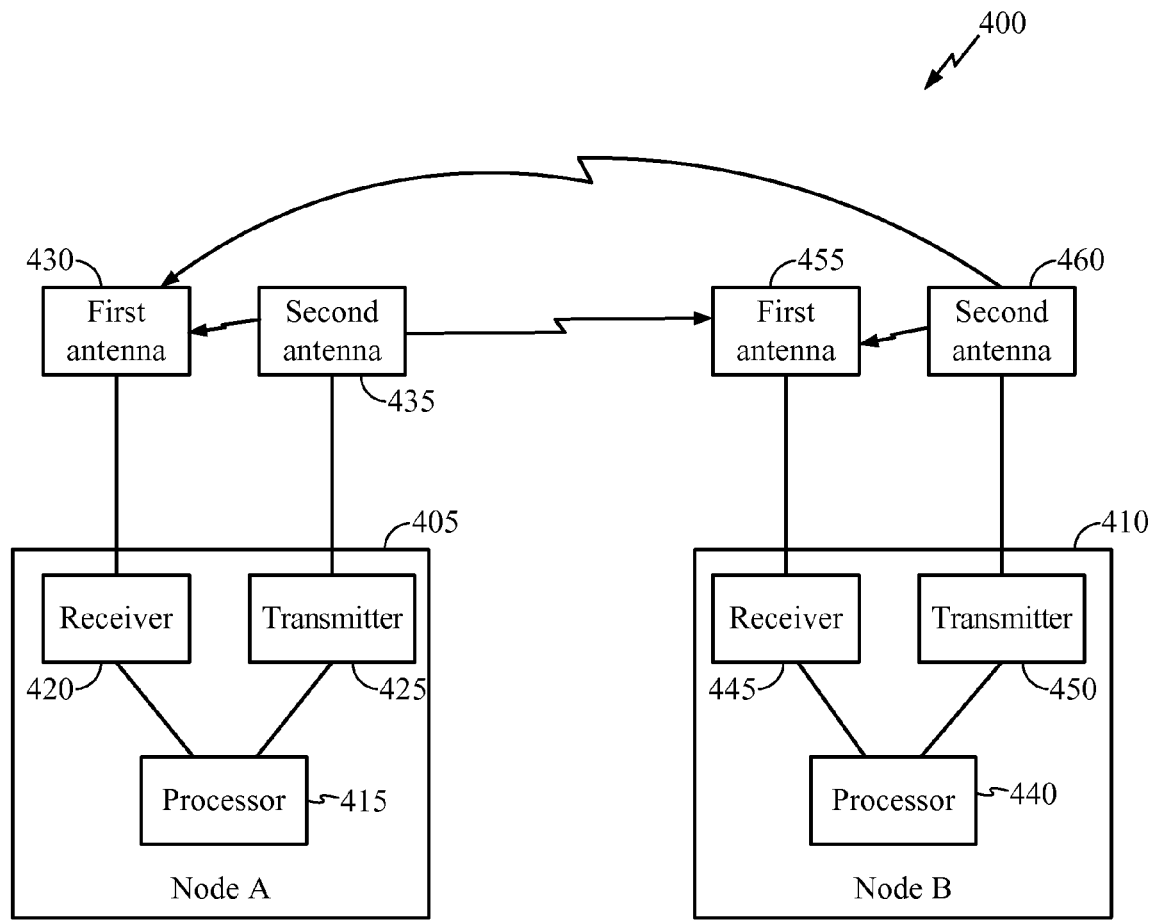
FIG. 4 is a schematic diagram of a system comprising two nodes transmitting one or more signals to each other according to one implementation.

FIG. 4 is a schematic diagram of a system 400 comprising two nodes transmitting one or more signals to one another according to one implementation. As shown, system 400 includes Node A 405 and Node B 410. In this example, Node A 405 desires to determine its range from Node B 410. For example, Node B 410 may have a known location, such as designated by earth-centered coordinates, and Node A 405 may transmit a beacon message containing a probe request to Node B and may estimate its range to Node B 410 based on an RTD measurement for a response to be received from Node B 410. As discussed above, processing, Rx chain, and Tx chain delays may be subtracted from a measured RTD and a range may thereafter be estimated based on an RTD measurement minus the measured delays.

In this example, each of Node A 405 and/or Node B 410 may comprise a wireless communication device, such as a mobile device, access point, base station, or any other wireless device capable of receiving and transmitting wireless signals. Node A 405 may include various components, such as a processor 415, receiver 420, and transmitter 425. Node A 405 may also include one or more antennas for transmitting and/or receiving wireless signals. In the implementation shown in FIG. 4, Node A 405 includes two antennas—a first antenna 430 and a second antenna 435. However, it should be appreciated that in some implementations, a particular node may include only a single antenna used for both transmitting and receiving wireless signals. In this example, first antenna 430 is utilized to receive wireless signals, and second antenna 435 is utilized to transmit wireless signals. Accordingly, first antenna 430 is therefore part of an Rx chain for Node A 405 and second antenna 435 is part of a Tx chain for Node A 405.

Node B 410 may include various components, such as a processor 440, receiver 445, and transmitter 450. Node B 410 may also include one or more antennas for transmitting and/or receiving wireless signals. In the implementation shown in FIG. 4, Node B 410 includes two antennas—a first antenna 455 and a second antenna 460. In this example, first antenna 455 may receive wireless signals, and second antenna 460 may transmit wireless signals. Accordingly, first antenna 455 is therefore part of an Rx chain for Node B 410 and second antenna 460 is part of a Tx chain for Node B 410.

Figure 5:
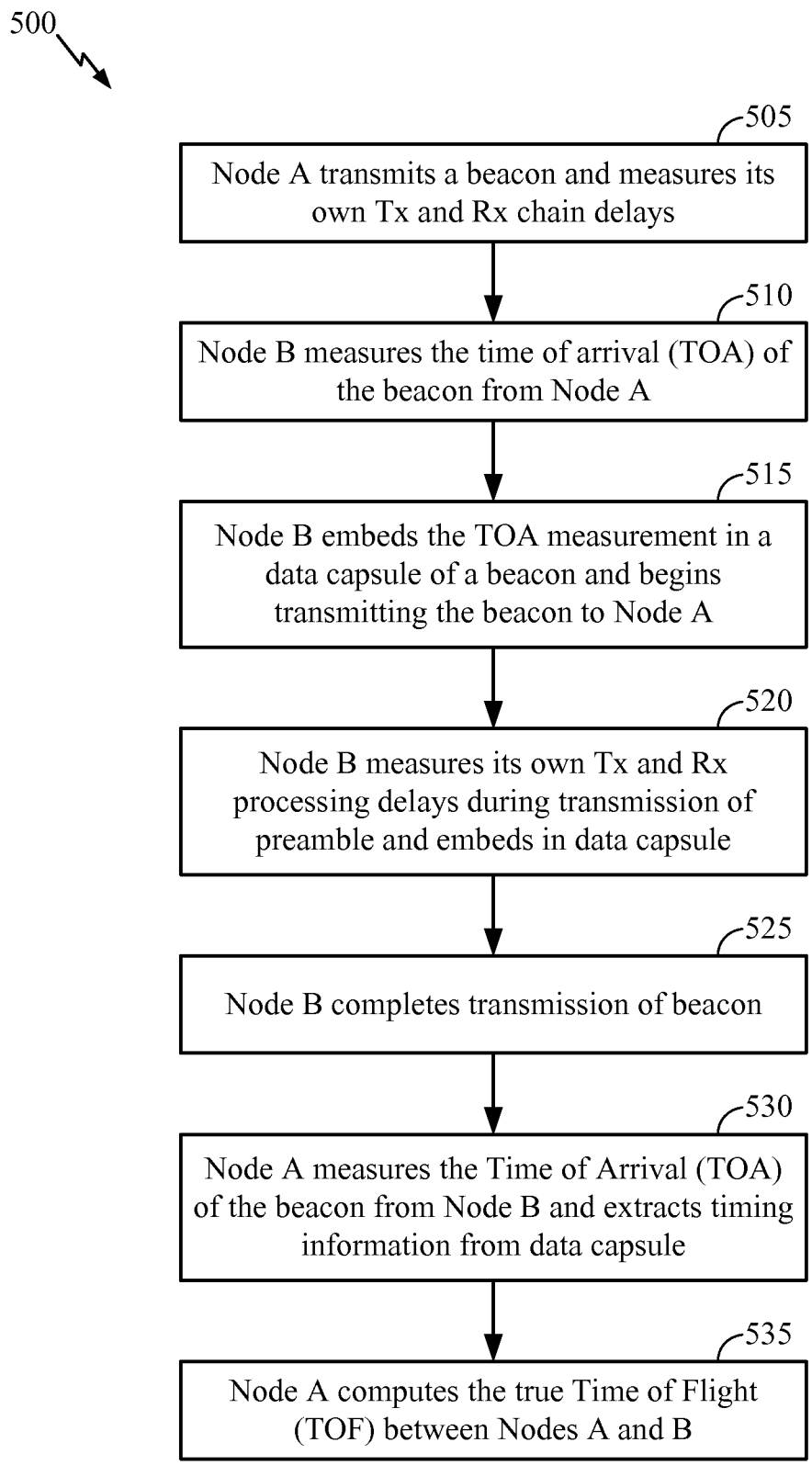
FIG. 5 is a flow diagram illustrating a process for measuring an RTD between two nodes according to one implementation.

FIG. 5 is a flow diagram illustrating a process 500 for measuring an RTD between two nodes according to one implementation. For example, process 500 may be implemented by Nodes A and B discussed above with respect to FIG. 4. First, at operation 505, Node A transmits a beacon message and measures its own Tx and Rx chain delays during transmission. Referring to FIG. 4, if Node A 405 is transmitting a beacon message to Node B 410, such a beacon message may be transmitted via a Tx chain including transmitter 425 and second antenna 435. Some of the beacon message may leak back to first antenna 430 and be received by an Rx chain of Node A 405. A measurement of Tx and Rx chain delays may be determined based on a leaked signal. A value of the measurement of Tx and Rx chain delays may be determined based at least in part on a duration from providing a signal to transmitter 425 for transmission to receipt by receiver 420. Node A may store a measurement of its own Rx and Tx chain delays in a memory device.

Referring back to FIG. 5, at operation 510, Node B may receive a beacon message from Node A and measure a time of arrival (TOA) of the beacon message. A TOA measured by Node B may be indicative of a time at which a beacon message transmitted by Node A is received and passed through an Rx chain of Node B. A TOA measurement by Node B may be made with reference to an internal clock of Node B. Nodes A and B may transmit frames of information/data with respect to a system clock. A frame may include a frame boundary. If Node B receives a beacon message from Node A, Node B may measure a time difference between a frame boundary of the received beacon message and an expected frame boundary based on its own internal clock, which is derived from a system or network clock. A TOA measurement for a beacon message may be equal to such a time difference from an expected frame boundary.

Next, at operation 515, Node B may embed the TOA measurement in a data capsule of a beacon message and may subsequently begin transmitting the beacon message to Node A. It should be appreciated that Node B is not required to immediately transmit a beacon message to Node A after receiving a beacon message from Node A and determining a TOA. A TOA measurement may be transmitted to Node A to allow Node A to determine an amount of time for transmission of a beacon message by Node A to receipt by Node B. If a Tx chain delay from Node A and an Rx chain delay from Node B can be determined and subtracted from the TOA measurement, and any timing differentials between internal clocks for Nodes A and B relative to a master system clock can be determined, then the actual time that the beacon message was traveling wirelessly may be determined.

Nodes A and B may not be able to readily determine differentials between their own internal clocks and a master system clock, such as, for example, if clocks of Nodes A and B are not synchronized. To account for such internal clock timing differentials, a beacon message may be transmitted from Node B to Node A and a TOA for such a beacon message may be measured and then averaged with the TOA observed for a beacon message transmitted from Node A to Node B. By averaging such TOAs for beacon messages sent from Node A to B and from Node B to A, any internal clocking timing differentials between internal clocks of Nodes A and B may effectively cancel out, resulting in an average TOA measurement which is not adversely affected by a lack of synchronization between internal clocks of Nodes A and B.

Referring back to FIG. 5, at operation 520 Node B may measure its own Tx and Rx chain processing delays during transmission of a beacon message preamble and then embed such measurements in a data capsule of the beacon message. At operation 525, Node B may complete transmission of its beacon message to Node A. Next, at operation 530, Node A may measure a TOA of the beacon message from Node B and extract timing information from a data capsule of the beacon message from Node B. At this point, Node A has measurements of its own Tx and Rx chain delays, measurements of Tx and Rx chain delays for Node B, a TOA for a beacon message transmitted from Node A to Node B, and a TOA for a beacon message transmitted from Node B to Node A.

Finally, at operation 535, Node A computes the true time of flight (TOF) between Nodes A and B. TOF may be computed based on use of Equation C, as discussed above.

Figure 6:
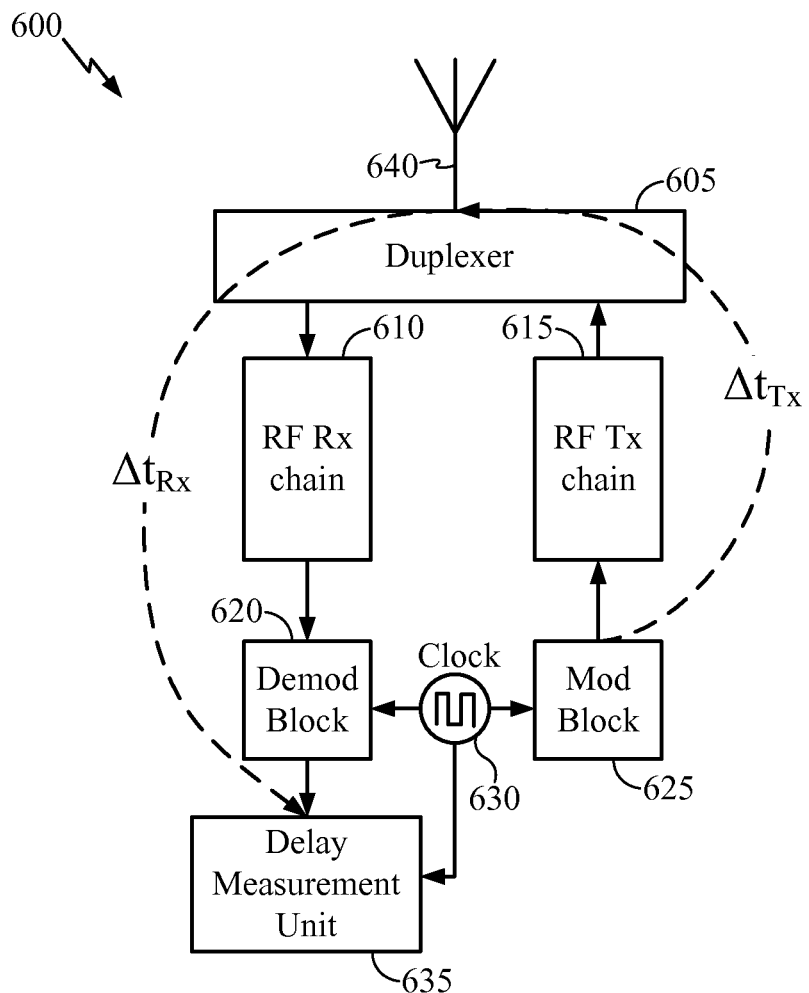
FIG. 6 is a schematic diagram of an RF architecture used in a system having full duplex frequency division duplex (FDD) transceivers according to one implementation.

FIGS. 6-10 illustrate different RF architectures for transmitting beacon messages and measuring TOF between nodes. FIG. 6 is a schematic diagram of an RF architecture 600 used in a system having full duplex FDD transceivers according to one implementation. In such a system, two nodes participating in an RTD measurement include a base station (or access point) and a mobile device (or access terminal). Depending on whether a base station or mobile device initiates transmission of a first beacon message, such a beacon message is transmitted on downlink (or forward link) or uplink (or reverse link) respectively. Transmission of a subsequent beacon message from a device receiving the first beacon message may therefore be performed over an uplink (or reverse link) or downlink (or forward link) respectively.

A "forward link," as used herein, may refer to a communication link from a base station to a mobile device. A "reverse link," as used herein, may refer to a communication link from a mobile device to a base station. An "uplink," as used herein, may refer to a communication link from a mobile station to a base station. A "downlink," as used herein, may refer to a communication link from a base station to a mobile station. "Forward link" and "downlink" are interchangeable terms, as used herein. Similarly, "reverse link" and "uplink" are interchangeable terms as used herein.

RF architecture 600 shown in FIG. 6 may include several components, such a duplexer 605, an RF Rx chain 610, an RF Tx chain 615, a demodulation (demod) block 620, a modulation (mod) block 625, a clock 630, a delay measurement unit 635, and an antenna 640. A Tx processing delay associated with RF architecture 600 may comprise, but is not limited to, digital processing associated with the modulator 625, RF Tx chain 615, and a delay through duplexer 605 from RF Tx chain 615 to antenna 640. An Rx chain delay, on the other hand, may comprise, but is not limited to, a signal's delay through duplexer 605, RF Rx chain 610, and the processing associated with the demodulator block 620.

During beacon message transmission, part of a signal transmitted via antenna 640 is reflected back through duplexer 605, passes through RF Rx chain 610, and arrives at demodulator block 620. At this point, accuracy of a time delay estimate is limited by a sampling clock frequency clock 630 of RF architecture 600. The sampling clock rate may be set to, for example, twice an operating bandwidth of the RF architecture 600. For example, for a CDMA IX system, a sampling clock rate may be set at ~2.5 MHz. Therefore, accuracy associated with such a measurement is still in the hundreds of meters.

Delay measurement unit 635 may apply a curve fitting algorithm, such as a parabolic fit, to an output of demodulator block 620 to enhance an accuracy of a measurement of Rx and Tx chain delays. Performance of delay measurement unit 635 may be a function of a signal to noise ratio of the beacon message received. However, for signal to noise ratios of interest (for example, those greater than ~5 dB), it can be shown that the accuracy of a delay estimate may be improved by a factor of 8 to 16. An output of delay measurement unit 635 is a value that is used as an Rx and Tx delay estimate locally and may also be embedded in a data capsule to be reported to the other node.

As seen in FIG. 6, therefore, a processing delay estimated for RF architecture 600 is very close to a real value associated with each node:

$$t_{BTF}^{node} = \Delta t_{Rx}^{node} + \Delta t_{Tx}^{node} \qquad \text{["Equation D"]}$$

While performing TOF measurements in a peer-to-peer setting, in one implementation, a beacon message may be transmitted by a mobile device or access terminal on a reverse link or uplink, as it is often performed. However, receiving nodes such as other mobile devices or access terminals, may now have to be able to receive and demodulate a reverse link (or uplink) signal in addition to receiving and demodulating a forward link or downlink signal as they normally do. FIGS. 7-10 depict various device architectures for performing RTD measurements in a peer-to-peer setting.

Figure 7:
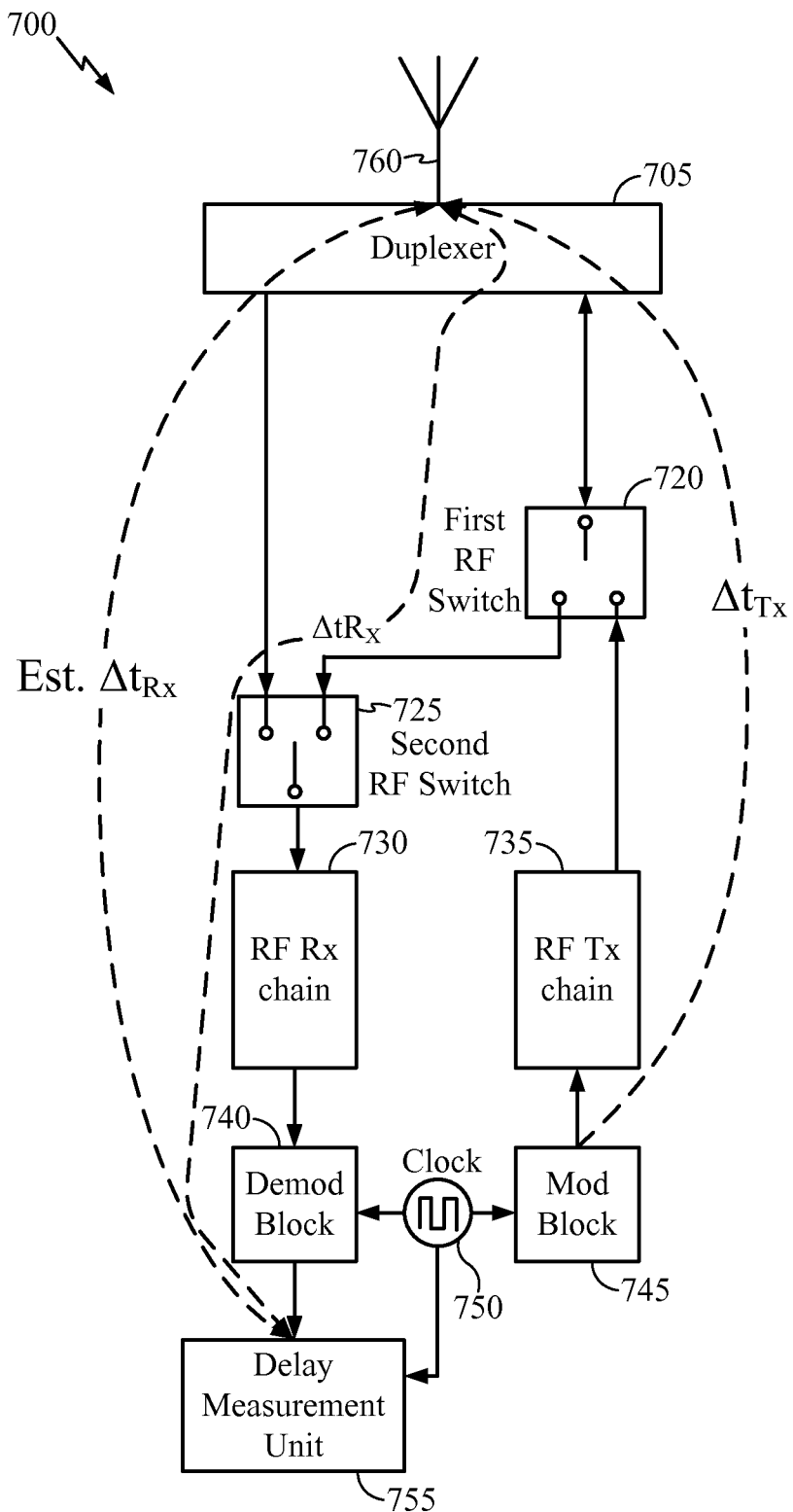
FIG. 7 is a schematic diagram of a half duplex FDD (peer-to-peer) device with a single antenna and a single receive chain according to one implementation.

FIG. 7 is a schematic diagram of a half duplex FDD (peer-to-peer) device 700 with a single antenna and a single receive chain according to one implementation. Half duplex FDD device 700 may include various components, such as a duplexer 705, a first RF switch 720, a second RF switch 725, an RF Rx chain 730, an RF Tx chain 735, a demodulation (demod) block 740, a modulation (mod) block 745, a clock 750, a delay measurement unit 755, and an antenna 760.

First and second RF switches 720 and 725, respectively, are included in Tx and Rx chains respectively. In a normal full duplex operation, first RF switch 720 may connect RF Tx chain 735 to duplexer 705, and second RF switch 725 may connect duplexer 705 to RF Rx chain 730. Such a configuration may also be utilized when half duplex FDD device 700 is transmitting a ranging beacon message.

A measured processing delay, therefore in this case, is given by $$\tilde{t}_{BTF}^{node} = \text{Est.}\Delta t_{Rx}^{node} + \Delta t_{Tx}^{node} \quad \text{[``Equation E'']}$$

A receiving node, on the other hand, may have first RF switch 720 connecting duplexer 705 to second RF switch 725, which in turn may connect first RF switch 720 to RF Rx chain 730. RF Rx chain 730, in this configuration, may be tuned to a RL band to receive and demodulate a ranging beacon message received on a RL.

As shown in FIG. 7, a path of a received signal is through the duplexer 705, first RF switch 720, second RF switch 725, RF Rx chain 730, and demodulator block 740. Therefore, an Rx processing delay is given by $\Delta t_{Rx}$, and a real total processing delay is given by $$t_{BTF}^{node} = \Delta t_{Rx}^{node} + \Delta_{Tx}^{node} \quad \text{[``Equation F'']}$$

As seen from Equations E and F, and FIG. 7, a measured processing delay is slightly different than a true delay. A difference between a measured processing delay and a true delay may be in hundreds of picoseconds, potentially giving rise to an error of several centimeters that may be well within an error tolerance of ranging and positioning systems.

Figure 8:
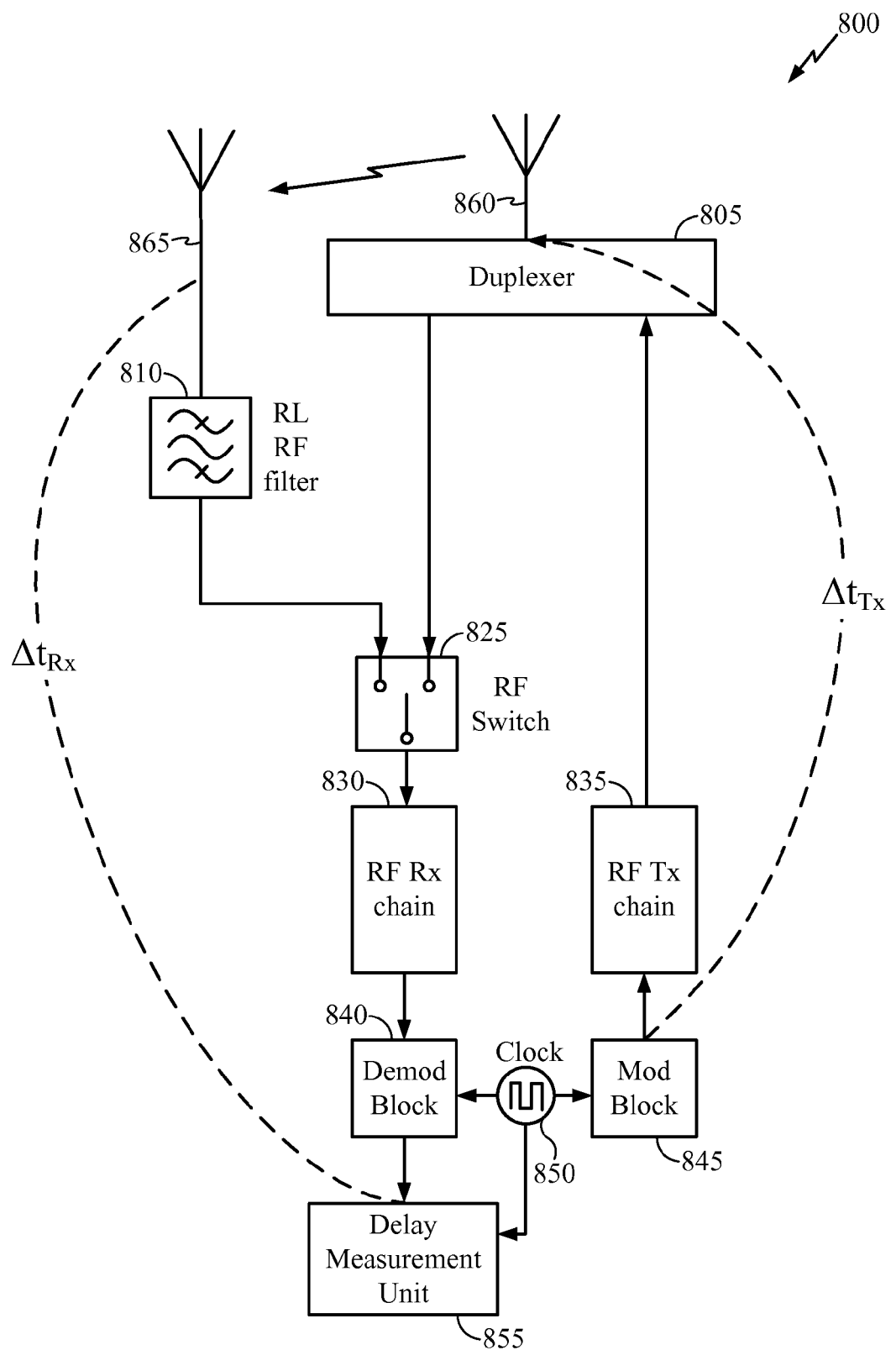
FIG. 8 is a schematic diagram of a half duplex FDD (peer-to-peer) device with two antennas and a single receive chain according to one implementation.

FIG. 8 is a schematic diagram of a half duplex FDD (peer-to-peer) device 800 with two antennas and a single receive chain according to one implementation. As shown, half duplex FDD device 800 may include various components, such as a duplexer 805, RL RF filter 810, RF switch 825, RF Rx chain 830, RF Tx chain 835, demodulation (demod) block 840, a modulation (mod) block 845, a clock 850, a delay measurement unit 855, a first antenna 860, and a second antenna 865.

An architecture shown in FIG. 8 utilizes a separate antenna (second antenna 865) and RL RF filter 810 to receive a ranging beacon message transmitted on an RL. An advantage of such a configuration is that RF Tx chain 835 may not incur an additional power attenuation due to introduction of an RF switch in the Tx path. For this configuration, both transmitting and receiving nodes may have an RF switch 825 connecting a RL RF filter 810 to RF Rx Chain 830.

If there is a negligible propagation delay between antennae 860 & 865, a processing delay, in this configuration, may comprise a sum of delays due to RF Tx chain 835, duplexer 805, RL RF filter 810, RF switch 825, RF Rx chain 830, and demodulator block 840. RF Rx chain 830 may be tuned to an RL frequency to receive and demodulate a ranging beacon message transmitted on an RL band. A processing delay, therefore, is again given by $t_{BTF}^{node} = \Delta t_{Rx}^{node} + \Delta t_{Tx}^{node}$ An additional BOM cost of an architecture shown in FIG. 8 may be very similar to an architecture shown in FIG. 7.

Figure 9:
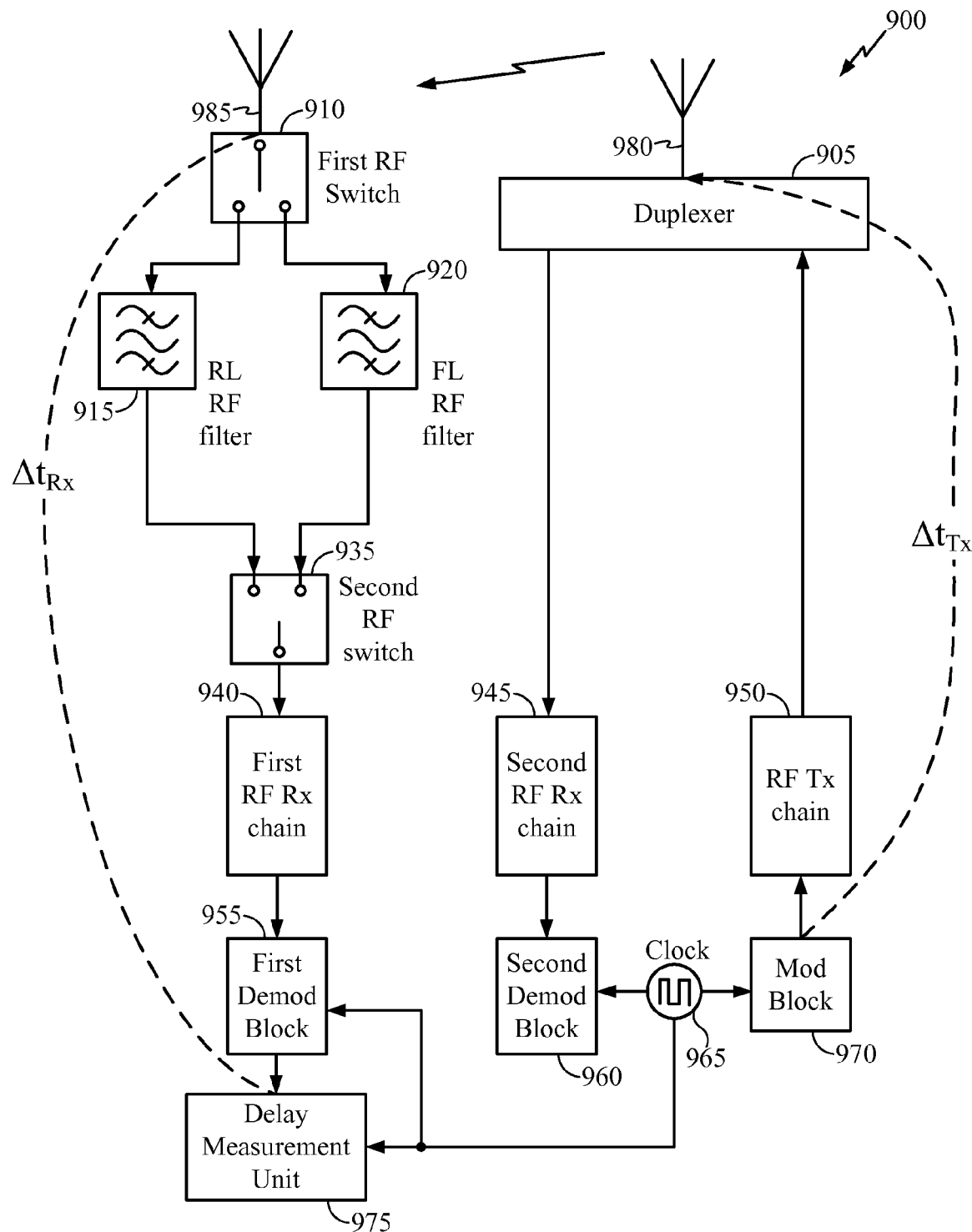
FIG. 9 is a schematic diagram of a half duplex FDD (peer-to-peer) device with receive diversity according to one implementation.

FIG. 9 is a schematic diagram of a half duplex FDD (peer-to-peer) device 900 with receive diversity according to one implementation. As shown, half duplex FDD device 900 may include various components, such as a duplexer 905, first RF switch 910, RL RF filter 915, FL RF filter 920, second RF switch 935, first RF Rx chain 940, second RF Rx chain 945, RF Tx chain 950, first demodulation (demod) block 955, second demodulation block 960, clock 965, modulation (mod) block 970, delay measurement unit 975, first antenna 980, and second antenna 985.

An architecture shown in FIG. 9 may be suited, for example, for devices having dual RF Rx chains for receive diversity. A secondary Rx chain (labeled as first RF Rx chain 940 in FIG. 9), in this case, may be the one used to receive and demodulate a ranging beacon message. Again, similar to a configuration of FIG. 8, if there is a negligible propagation delay between antennae 980 & 985, a processing delay may be due to delays through RF Tx chain 950, duplexer 905, first RF switch 910, RL RF filter 915, second RF switch 935, first RF Rx chain 940, and first demodulator block 955. A total delay is, therefore, given by $t_{BTF}^{node} = \Delta t_{Rx}^{node} + \Delta t_{Tx}^{node}$ An advantage of such a configuration is that attenuation due to RF switches has been removed from a primary Rx chain (labeled as second RF Rx chain 945 in FIG. 9) and moved to the first RF Rx chain 940 where such RF switches can be better tolerated.

Figure 10:
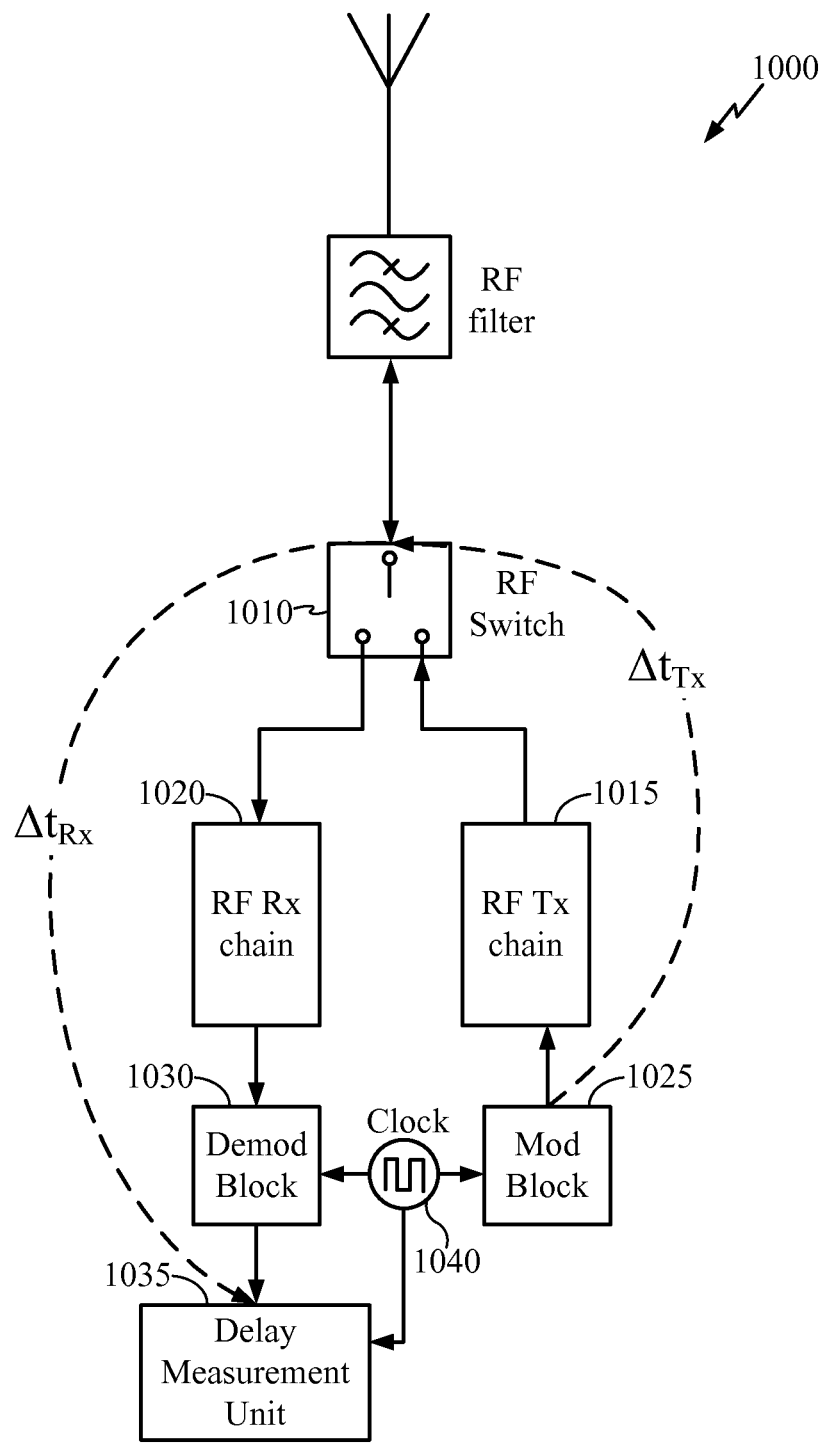
FIG. 10 is a schematic diagram of an RF architecture used in a system having time division duplex (TDD) transceivers according to one implementation.

FIG. 10 illustrates a schematic diagram of an RF architecture 1000 used in a system having time division duplex (TDD) transceivers according to one implementation. In such a system, two nodes participating in an RTD measurement include a base station (or access point) and a mobile device (or access terminal). Depending on whether a base station or mobile device initiates transmission of a first beacon message, such a beacon message is transmitted on downlink (or forward link) or uplink (or reverse link) respectively. Transmission of a subsequent beacon message from a device receiving the first beacon message may therefore be performed over an uplink (or reverse link) or downlink (or forward link) respectively. Such messages, however, may be transmitted over the same frequency channel for a TDD system but in their respective time slots.

In a peer-to-peer configuration of a TDD system, for example, two nodes participating in an RTD measurement may include two mobile devices (or access terminals.) In an example, beacon messages may be exchanged between two mobile devices.

RF architecture 1000 shown in FIG. 10 may include several components, such a RF filter 1005, an RF switch 1010, an RF Tx chain 1015, an RF Rx chain 1020, a modulation (mod) block 1025, a demodulation (demod) block 1030, a delay measurement unit 1035, a clock 1040, and an antenna 1045. A Tx processing delay associated with RF architecture 1000 may comprise, but is not limited to, digital processing associated with RF Tx chain 1015 and a delay through RF switch 1010. An Rx chain delay, on the other hand, may comprise, but is not limited to, a signal's delay through RF switch 1010, RF Rx chain 1020, and the processing associated with the demodulator block 1030.

A processing delay, in this configuration, therefore, is again given by $$t_{BTF}^{node} = \Delta t_{Rx}^{node} + \Delta t_{Tx}^{node}$$

A mobile device may communicate with another mobile device, access terminal, or any other wireless device via one or more wireless protocols and/or standards, such as IEEE 802.11, 802.15, or 802.16, Worldwide Interoperability for Microwave Access (WiMAX), or Bluetooth™, to name just a few among many different types of wireless protocols and/or standards.

Circuitry, such as transmitters and/or receivers may provide functionality, for example, through the use of various wireless communication networks such as a wireless wide area network (WWAN), a wireless local area network (WLAN), a wireless personal area network (WPAN), and so on. The term "network" and "system" are often used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATS) such as CDMA2000, Wideband-CDMA (W-CDMA), and so on. CDMA2000 includes IS-95, IS-2000, and IS-856 standards. A TDMA network may implement Global System for Communications (GSM), Digital Advanced Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN. The techniques may be implemented for use with an Ultra Mobile Broadband (UMB) network, a High Rate Packet Data (HRPD) network, a CDMA2000 1X network, GSM, Long-Term Evolution (LTE), and/or the like.

Figure 11:
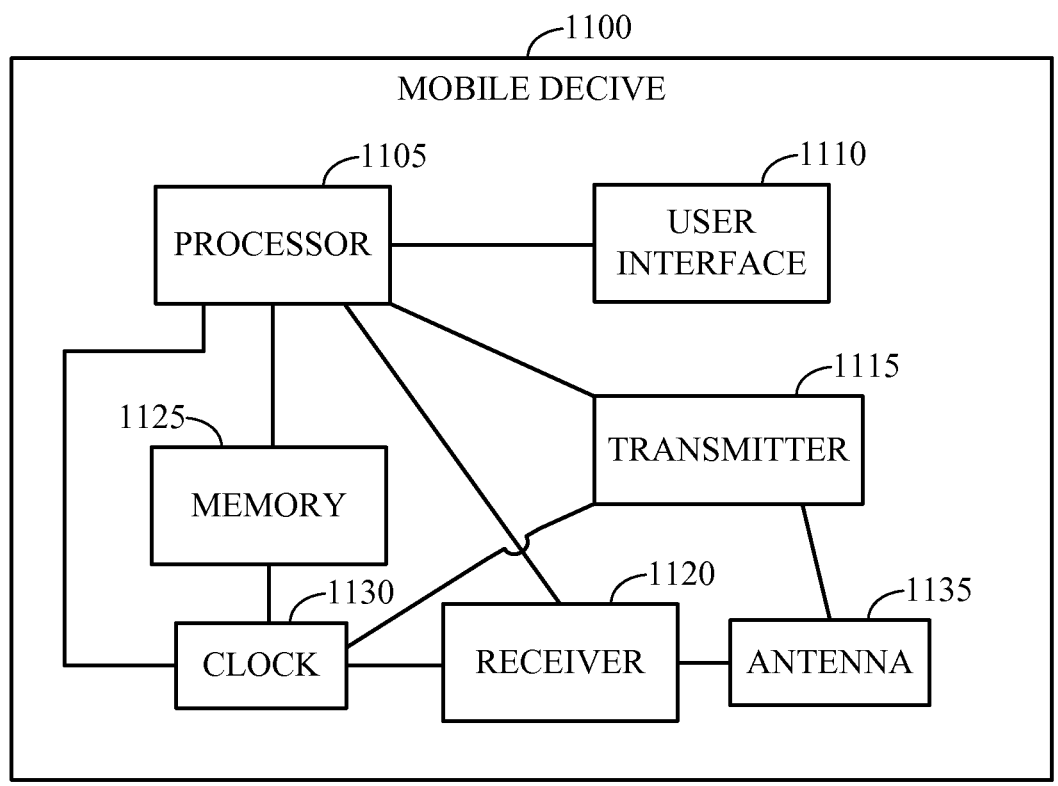
FIG. 11 is a schematic block diagram of a mobile device according to one implementation.

FIG. 11 is a schematic block diagram of a particular implementation of a mobile device 1100 according to one implementation. Mobile device 1100 may comprise a mobile station (MS) in which a radio transmitter may be adapted to modulate an RF carrier signal with baseband information, such as voice or data, onto an RF carrier, and a radio receiver may demodulate a modulated RF carrier to obtain such baseband information.

Mobile device 1100 may include several elements such as a processor 1105, user interface 1110, transmitter 1115, receiver 1120, memory 1125, clock 1130, and antenna 1135. User interface 1110 may comprise a plurality of devices for inputting or outputting user information such as voice or data. Such devices may include, for example, a keyboard, a display screen, a microphone, a speaker, buttons and knobs, just to name a few examples.

Memory 1125 may be adapted to store machine-readable instructions, which are executable to perform one or more of processes, examples, implementations, or examples thereof that have been described or suggested. Processor 1105 may be adapted to access and execute such machine-readable instructions. Through execution of these machine-readable instructions, processor 1105 may direct various elements of mobile device 1100 to perform one or more functions.

Transmitter 1115 may utilize antenna 1135 to transmitting communications, such as packet-based communications to other wireless devices. Receiver 1120 may also utilize such antenna 1135 to receive communications, such as packet-based communications from other wireless devices. Clock 1130 may be utilized to determine a time at which a signal is transmitted and/or received.

Some portions of the detailed description above are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. For example, a specific computing apparatus may comprise one or more processors programmed with instructions to perform one or more specific functions.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

For a firmware and/or hardware/software implementations, certain methodologies may be implemented with modules (e.g., procedures, functions, and so on) that perform the functions described herein. Any machine readable medium tangibly embodying instructions may be used in implementing the methodologies described herein. For example, software codes may be stored in a memory of a mobile station and/or an access point and executed by a processing unit of the device. Memory may be implemented within a processing unit and/or external to the processing unit. As used herein the term "memory" refers to any type of long term, short term, volatile, nonvolatile, or other memory and is not to be limited to any particular type of memory or number of memories, or type of media upon which memory is stored.

If implemented in hardware/software, functions that implement methodologies or portions thereof may be stored on and/or transmitted over as one or more instructions or code on a computer-readable medium. A computer-readable medium may take the form of an article of manufacture. A computer-readable medium may include computer storage media and/or communication media including any medium that facilitates transfer of a computer program from one place to another. A storage media may be any available media that may be accessed by a computer or like device. By way of example but not limitation, a computer-readable medium may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

"Instructions" as referred to herein relate to expressions that represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands that are executable by a processing unit having a command set which includes the encoded commands. Such an instruction may be encoded in the form of a machine language understood by the processing unit. Again, these are merely examples of an instruction and claimed subject matter is not limited in this respect.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method, comprising:
   forming a preamble and at least one data capsule at a first observed time measurement;
   wirelessly transmitting a first signal from a first wireless device at a second observed time measurement, wherein the first signal comprises the preamble and the at least one data capsule;
   receiving, by a receiver of the first wireless device at a third observed time measurement, at least a portion of the preamble of the first signal during transmission of the preamble of the first signal;
   measuring a combined first transmit chain and first receive chain delay of the first wireless device based at least in part on a calculated difference between the third and first observed time measurements during the transmission of the preamble of the first signal; and
   embedding a measurement of the combined first transmit chain and first receive chain delay of the first wireless device within the at least one data capsule of the first signal during the transmission of the preamble of the first signal, wherein the measurement is wirelessly transmitted within the at least one data capsule of the first signal.

2. The method of claim 1, wherein the first signal is transmitted from the first wireless device to a second wireless device.

3. The method of claim 1, wherein the first signal is transmitted from the first wireless device to a wireless network.

4. The method of claim 1, further comprising receiving a second signal-wirelessly transmitted from a second wireless device, wherein a second combined transmit chain and second receive chain delay associated with a transmission of the second signal is embedded within the second signal.

5. The method of claim 4, wherein the second wireless device comprises a femtocell.

6. The method of claim 4, further measuring a first time delay between receiving the second signal and a frame boundary of a data frame based at least in part on a network clock.

7. The method of claim 6, wherein the second signal comprises a measurement of a second time delay measured by the second wireless device between receiving the first signal and the frame boundary of the data frame based at least in part on the network clock.

8. The method of claim 7, further comprising estimating a Round Trip Time for signals transmitted between the first wireless device and the second wireless device by summing the first time delay and the second time delay, and subtracting the combined first transmit chain and first receive chain delay and the second combined transmit chain and second receive chain delay.

9. The method of claim 8, further comprising estimating a Time of Flight for the signals transmitted between the first wireless device and the second wireless device by dividing the Round Trip Time by a factor of two.

10. The method of claim 1, wherein at least a portion of the transmit chain delay comprises a time delay incurred by the first signal propagating though an antenna of a transmitter of the first wireless device.

11. The method of claim 1, wherein at least a portion of the receive chain delay comprises a time delay incurred by the first signal propagating though an antenna of the receiver of the first wireless device.

12. An apparatus, comprising:
    a transmitter to wirelessly transmit a first signal at a first observed time measurement, wherein the first signal comprises a preamble and at least one data capsule;
    a receiver to receive at least a portion of the preamble of the first signal during transmission of the preamble of the first signal at a second observed time measurement; and
    a processor programmed with instructions to:
      form the preamble and the at least one data capsule at a third observed time measurement;
      estimate a combined first transmit chain and first receive chain delay of the apparatus based at least in part on a calculated difference between the third and second observed time measurements of the first signal during the transmission of the preamble of the first signal, and
      embed a measurement of the combined first transmit chain and first receive chain delay of the first wireless device within the at least one data capsule of the first signal during the transmission of the preamble of the first signal, wherein the measurement is wirelessly transmitted within the at least one data capsule of the first signal.

13. The apparatus of claim 12, wherein the transmitter is configured to transmit the first signal to a wireless device.

14. The apparatus of claim 12, wherein the transmitter is configured to transmit the first signal to a wireless network.

15. The apparatus of claim 12, wherein the receiver is configured to receive a second signal wirelessly transmitted from a wireless device, wherein a second combined transmit chain and second receive chain delay associated with a transmission of the second signal is embedded within the second signal.

16. The apparatus of claim 15, wherein the wireless device comprises a femtocell.

17. The apparatus of claim 15, wherein the processor is configured to measure a first time delay between receiving the second signal and a frame boundary of a data frame based at least in part on a reference clock of the apparatus.

18. The apparatus of claim 17, wherein the second signal comprises a measurement of a second time delay measured by the wireless device between receiving the first signal and the frame boundary of the data frame based at least in part on a reference clock of the wireless device.

19. The apparatus of claim 18, wherein the processor is configured to estimate a Round Trip Time for signals transmitted between the apparatus and the wireless device by summing the first time delay and the second time delay, and subtracting the combined first transmit chain and first receive chain delay and the second combined transmit chain and second receive chain delay.

20. The apparatus of claim 19, wherein the processor is configured to estimate a Time of Flight for the signals transmitted between the apparatus and the wireless device by dividing the Round Trip Time by a factor of two.

21. The apparatus of claim 12, wherein the apparatus comprises full frequency division duplex circuitry.

22. The apparatus of claim 12, wherein the apparatus comprises half frequency division duplex circuitry.

23. The apparatus of claim 22, wherein the apparatus comprises two antennas and the half frequency division duplex circuitry implements a single receive signal chain.

24. The apparatus of claim 22, wherein the apparatus comprises two antennas and the half frequency division duplex circuitry implements two receive signal chains.

25. The apparatus of claim 12, wherein the apparatus comprises time division duplex circuitry.

26. The apparatus of claim 25, wherein the processor is programmed to selectively switch between the receiver and the transmitter.

27. An apparatus, comprising:
   means for forming a preamble and at least one data capsule at a first observed time measurement;
   means for wirelessly transmitting a first signal at a second observed time measurement, wherein the first signal comprises the preamble and the at least one data capsule;
   means for receiving at least a portion of the preamble of the first signal during transmission of the preamble of the first signal at a third observed time measurement;
   means for estimating a combined first transmit chain and first receive chain delay of the apparatus based at least in part on a calculated difference between the third and first observed time measurements during the transmission of the preamble of the first signal; and
   means for embedding a measurement of the combined first transmit chain and first receive chain delay within the at least one data capsule of the first signal during the transmission of the preamble of the first signal, wherein the measurement is wirelessly transmitted within the at least one data capsule of the first signal.

28. The apparatus of claim 27, wherein the means for transmitting is configured to transmit the first signal to a wireless device.

29. The apparatus of claim 27, wherein the means for transmitting is configured to transmit the first signal to a wireless network.

30. The apparatus of claim 27, wherein the means for receiving is configured to receive a second signal wirelessly transmitted from a wireless device, wherein a second combined transmit chain and second receive chain delay associated with a transmission of the second signal is embedded within the second signal.

31. The apparatus of claim 30, wherein the wireless device comprises a femtocell.

32. The apparatus of claim 30, further comprising means for measuring a first time delay between receiving the second signal and a frame boundary of a data frame based on a reference clock of the apparatus.

33. The apparatus of claim 30, wherein the second signal comprises a measurement of a second time delay measured by the wireless device between receiving the first signal and the frame boundary of the data frame based on a reference clock of the wireless device.

34. The apparatus of claim 33, wherein the means for estimating is configured to estimate a Round Trip Time for signals transmitted between the apparatus and the wireless device by summing the first time delay and the second time delay, and subtracting the combined first transmit chain and first receive chain delay and the second combined transmit chain and second receive chain delay.

35. The apparatus of claim 34, wherein the means for estimating is configured to estimate a Time of Flight for the signals transmitted between the apparatus and the wireless device by dividing the Round Trip Time by a factor of two.

36. The apparatus of claim 27, wherein the apparatus comprises full frequency division duplex circuitry.

37. The apparatus of claim 27, wherein the apparatus comprises half frequency division duplex circuitry.

38. The apparatus of claim 37, wherein the apparatus comprises two antennas and the half frequency division duplex circuitry implements a single receive signal chain.

39. The apparatus of claim 37, wherein the apparatus comprises two antennas and the half frequency division duplex circuitry implements two receive signal chains.

40. The apparatus of claim 27, wherein the apparatus comprises time division duplex circuitry.

41. The apparatus of claim 40, wherein the apparatus is programmed to selectively switch between the means for receiving and the means for wirelessly transmitting.

42. An article comprising: a non-transitory storage medium having stored thereon instructions executable by a processor to:
   form a preamble and at least one data capsule at a first observed time measurement;
   transmit of a first signal from a first wireless device at a second observed time measurement, wherein the first signal comprises the preamble and at the least one data capsule;
   measure a combined first transmit chain and first receive chain delay of the first wireless device based at least in part on a calculated difference between the first observed time measurement and a third observed time measurement at which the at least a portion of the preamble is received by a receiver of a device comprising the article during the transmission of the preamble of the first signal; and
   embed a measurement of the combined first transmit chain and first receive chain delay of the first wireless device within the at least one data capsule during the transmission of the preamble of the first signal, wherein the measurement is wirelesly transmitted within the at least one data capsule of the first signal.

43. The article of claim 42, wherein the instructions are further executable by the processor to determine a combined second transmit chain and second receive chain delay associated with a transmission of a second signal, by a second wireless device, to the first wireless device, wherein the combined second transmit chain and second receive chain delay is embedded within the second signal.

44. The article of claim 42, wherein the instructions are further executable by the processor to measure a first time delay between receiving the second signal and a frame boundary of a data frame based at least in part on a network clock.

45. The article of claim 42, wherein the instructions are further executable by the processor to determine a combined second transmit chain and second receive chain delay associated with a transmission of a second signal, by a second wireless device, the combined second transmit chain and second receive chain delay being embedded within the second signal.

46. The article of claim 45, wherein the instructions are further executable by the processor to measure a first time delay between receiving the second signal and a frame boundary of a data frame based on a network clock.

47. The article of claim 46, wherein the instructions are further executable by the processor to estimate a Round Trip Time for signals transmitted between the first wireless device and the second wireless device by summing the first time delay and a second time delay, and subtracting the combined first transmit chain and first receive chain delay and the second combined transmit chain and second receive chain delay, wherein the second signal comprises a measurement of a second time delay measured by the second wireless device between receiving the first signal and the frame boundary of the data frame based at least in part on the network clock.

48. The article of claim 47, wherein the instructions are further executable by the processor to estimate a Time of Flight for the signals transmitted between the first wireless device and the second wireless device by dividing the Round Trip Time by a factor of two.

* * * * *